(12) United States Patent
Shimamoto et al.

(10) Patent No.: US 6,544,307 B2
(45) Date of Patent: Apr. 8, 2003

(54) POLISHING COMPOSITION AND MANUFACTURING AND POLISHING METHODS

(75) Inventors: Hajime Shimamoto, Yamatokohriyama (JP); Shoji Ichikawa, Yamatokohriyama (JP); Katsumi Kondo, Tokyo (JP); Susumu Abe, Tokyo (JP); Kenji Takenouchi, Tokyo (JP)

(73) Assignee: Rodel Holdings, Inc., Wilmington, DE (US)

( * ) Notice: Subject to any disclaimer, the term of this patent is extended or adjusted under 35 U.S.C. 154(b) by 191 days.

(21) Appl. No.: 09/769,058

(22) Filed: Jan. 25, 2001

(65) Prior Publication Data

US 2002/0028632 A1 Mar. 7, 2002

(51) Int. Cl.⁷ .............................. C09K 3/14; C09G 1/02
(52) U.S. Cl. ................. 51/308; 51/303; 106/3; 106/5
(58) Field of Search ....................... 51/308, 303; 106/3, 106/5

(56) References Cited

U.S. PATENT DOCUMENTS

| 3,916,584 A | 11/1975 | Howard et al. |
| 4,842,837 A | 6/1989 | Shimizu et al. |
| 5,264,010 A | 11/1993 | Brancaleoni et al. |

FOREIGN PATENT DOCUMENTS

| EP | 0846741 A | 6/1998 |
| EP | 0967260 A | 12/1999 |
| JP | 07221059 A | 8/1995 |
| JP | 7-247105 A | 9/1995 |
| JP | 11060232 A | 3/1999 |
| JP | 11-116942 A | 4/1999 |
| JP | 11-279534 A | 10/1999 |
| JP | 11-302633 A | 11/1999 |

Primary Examiner—Michael Marcheschi
(74) Attorney, Agent, or Firm—Gerald K. Kita

(57) ABSTRACT

A polishing compound containing cocoon-shaped silica particles and crystal silica particles, and water-soluble polymers including; at least one type selected from the groups including ammonium nitrate and ammonium acetate, and at least one type selected from methylcellulose, carboxymethylcellulose, hydroxyethylcellulose, and the group including carboxymethylcellulose.

8 Claims, 4 Drawing Sheets

POLISHING COMPOSITION AND MANUFACTURING AND POLISHING METHODS

This application claims the benefit of Japanese Patent Application Number 2000-219901, filed Jul. 19, 2000.

The invention relates to polishing compounds, i.e. polishing compositions, also called polishing slurries, which are used in the manufacturing processes of polishing the surfaces of semiconductor substrates of, for example, silicon wafers, semiconductors, multichip modules, and electronic parts other than silicon wafers and multichip modules and electronic parts. Further, the invention relates to, methods of manufacturing polishing compounds, and polishing methods using polishing compounds when polishing the surfaces of semiconductor substrates.

Chemical Mechanical Polishing, hereafter also called CMP polishing, uses known polishing slurries in which are dispersed silica particles in an aqueous medium. CMP polishing of a semiconductor substrate is divided into three steps, called stock removal polish, intermediate, polish and final polish. The condition of the substrate surface at the conclusion of the final polish is scratch-free and haze-free. Furthermore, a perfect mirror surface with flatness is obtained. Such a surface is further referred to as a planar polished surface on the semiconductor substrate.

In the manufacture of polishing slurries for semiconductor substrates, having high purity raw materials with minimized impurities, silica particles, for example, fumed silica particles synthesized in the gas phase, have been used. However, fumed silica particles aggregate to form secondary aggregated particles., it being necessary to break up the aggregated particles, and disperse or dissolve the aggregated particles in water. If the break-up of the aggregated particles is not sufficient, the polishing slurry becomes more viscous in storage and thereafter, when used in a polishing operation, produces defects, such as, the appearance of scratches on the surface of the polished semiconductor substrate.

Known methods to disperse the aggregated particles of fumed silica use known low-speed beads mill or high speed agitation type dispersion equipment, but are not sufficient to disperse the silica particles.

For a polishing compound which prevents the agglomeration of secondary particles of silica particles, in Japanese patent bulletin H11-279534 and Japanese patent bulletin H11-302633, adding water-soluble cellulose derivatives and water-soluble organic amines is disclosed. However, exposure of the polishing compound to sunlight or ultraviolet light causes deterioration by the photodecomposition reaction of water-soluble cellulose and chemical amines. Further, by adding 1~10 weight % of types of amines to polishing compounds, there is an increase in the biochemical oxidant demand (BOD) load in the waste water stream. In this connection, from the point of view of prevention of water pollution, the amount of BOD must be less than 10 ppm. Accordingly, before discharging waste water after polishing, using the activity of bacteria in activated sludge, treatment by reducing the concentration 1/1000~1/10000 is necessary, adding a cost burden.

What is needed is a polishing compound which does not easily deteriorate in purity and further when polishing does not leave behind scratches or haze (cloudiness) on the polished surface.

SUMMARY OF THE INVENTION

This invention, in order to resolve these problems, provides a polishing compound for a slurry excelling in long term storage stability in which there is little contamination by metal ions, and while storing the slurry for a long period of time, neither agglomeration and settling nor, by the previous addition of chemicals to the slurry, discoloration by photodecomposition occurs.

The invention is to offer a polishing compound which also has excellent properties such that the combined abrasives contained in the slurry do not easily scar the substrate or said polishing layer with scratches or haze (cloudiness).

Further, the invention provides a method of polishing semiconductor substrate surfaces using a polishing compound.

Embodiments of the invention will now be described, by way of example, with reference to the accompanying drawings, according to which:

DETAILED DESCRIPTION

Figure 1:
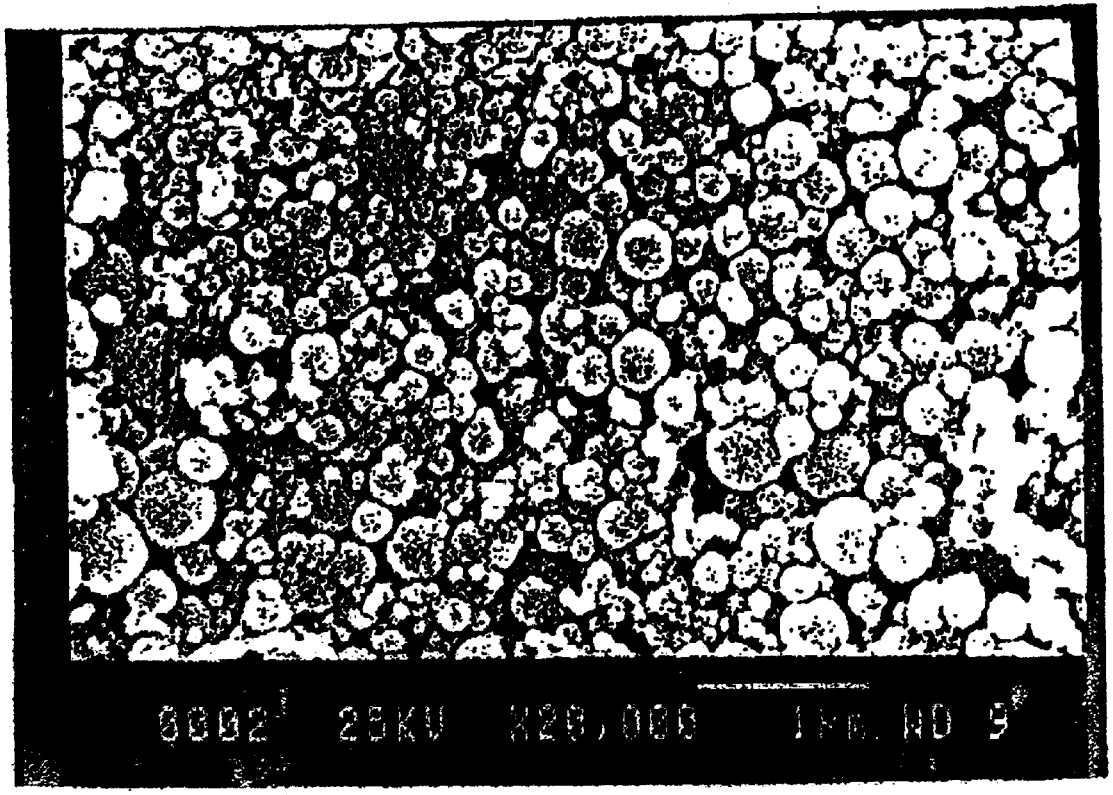
FIG. 1 is a photomicrograph of crystal silica particles

In present CMP polishing, a polishing pad, such as, IC1400 that is commercially available from Rodel, Inc., is attached to the lower platen of a known polishing machine, and a semiconductor substrate is installed correspondingly on the upper platen. Before polishing the surface of the pad on the lower platen is conditioned. The upper platen is pressed against the lower platen with a fixed load or down force, and while a polishing fluid, i.e. liquid, slowly flows in between the pad and the surface being polished, the surface is polished by the rotation of the upper and lower platens. Said polishing liquid is usually that which contains in an aqueous media polishing accelerants such as silica, alumina, alkali earth metals, etc. and wetting agents which have effective surface activity.

According to an embodiment, a polishing compound contains cocoon-shaped silica particles and crystal silica particles. In a further embodiment, the polishing compound is made as a composite of at least a portion of cocoon-shaped silica particles and at least a portion of crystal silica particles combined.

According to a further embodiment, combining, at least a portion of cocoon-shaped silica particles, and at least a portion of crystal silica, form combined abrasive particles.

The cocoon-shaped silica particles and crystal silica particles which are included in the polishing compound may be combined or not combined. Ordinarily, combined particles and uncombined cocoon-shaped particles and crystal silica particles are mixed. Cocoon-shaped silica particles and crystal silica particles are mixed in an aqueous medium and the polishing compound is obtained from dispersing using a pulverizer. During dispersing, the concentration of silica particles in the stock solution is desirably 3~70 weight %, more desirable is 10~50 weight %. If the concentration of silica particles is too low, because the dispersion efficiency is bad, the obtained polishing compound easily becomes unstable. If the concentration is too high, in the dispersion process because the aqueous medium becomes too little, it can happen that it will not flow. As an aqueous medium, water, ethanol, methanol, etc. and their mixtures can be used but deionized pure water is desirable.

A polishing composition or compound is provided as a slurry excelling in long term storage stability. Agglomeration and settling of particles do not occur in storage for long periods of time. Chemicals previously added to the slurry are without discoloration by photodecomposition reactions.

As an embodiment, the crystal silica is included at 0.5~80 weight % of the combination with cocoon-shaped silica particles.

As another embodiment, multiple water-soluble polymers are included at 0.01~0.5 weight %. According to an embodiment, the water-soluble polymers include, at least one type from the groups including ammonium nitrate and ammonium acetate is selected, and at least one type from methylcellulose, carboxymethylcellulose, hydroxyethylcellulose and the group including carboxymethylcellulose is selected.

An embodiment includes a polishing compound containing 100 parts by weight DI water, 10.0~20.0 parts by weight silica composite polishing abrasives, 0.01~0.5 parts by weight multiple water-soluble polymers and alkaline compounds for pH adjustment, said silica composite polishing abrasives including composite polishing abrasives formed by combining cocoon-shaped silica particles and crystal silica particles. A combination of cocoon-shaped silica particles and crystal silica particles is produced by using wet mechanical alloying combination technology. An embodiment of a manufacturing method of a polishing compound combines cocoon-shaped silica particles and crystal silica particles in a wet mechanical alloying combination process. An embodiment of a wet mechanical alloying combination process is performed using beads made of zirconium oxide partially stabilized by yttrium. In a wet method mechanical alloy process, while the particles rub against one another with a large amount of pulverizing energy, the crystal silica particles and the cocoon-shaped colloidal silica particles stick to each other.

According to an embodiment, polishing abrasives include composite silica abrasives formed by combining cocoon-shaped colloidal silica particles and spherical, monodispersed crystal silica, and not relying on water-soluble cellulose or water-soluble amines. The polishing compound does not easily react photochemically, its long term storage is excellent, and it is of high-purity.

An embodiment includes a process for eliminating by ultrafiltration large particles of stabilized zirconia abrasion detritus greater than 1 micron arising from the above described wet mechanical alloying combination process. A filter used in the above mentioned ultrafiltration is made with hollow fiber sheaves, joined cells are inserted into a sheath, the filtrate is directed to the interior of the hollow fibers, and as the liquid passes through to the outside, by the wall surface of the hollow fibers only composite particles of the product size are selected. According to an embodiment, the filter uses a filter cloth with a 0.8 micron cutoff. Another embodiment includes a process to combine the cocoon-shaped silica particles and crystal silica particles using a high pressure homogenizer.

A polishing method of this invention includes a polishing process for the surface of semiconductor wafers using the above described polishing compound. An excellent polished surface can be obtained with planarity and small amounts of scratching and haze on the surface of a semiconductor substrate.

An embodiment of the polishing compound of this invention includes cocoon-shaped silica particles and crystal silica particles. In an embodiment, the polishing compound includes an aqueous medium of deionized water, DI water, composite abrasives formed by the combination of cocoon-shaped silica particles and crystal silica particles, water-soluble polymers and alkaline compounds for pH adjustment. A desirable mixture proportion is for 100 parts by weight of DI water, composite silica abrasives of 10.0~20.0 parts by weight, water-soluble polymers 0.01~0.5 parts by weight, and an alkaline compound for pH adjustment, in the case of using KOH 0.07~0.7 parts by weight, and in the case of using ammonia 0.2~1.0 parts by weight.

As an alkaline compound, inorganic salts for example potassium hydroxide, sodium hydroxide, lithium hydroxide, etc., or organic amines such as ethylenediamine, triethylamine, piperazine, etc. can be used.

Further, the polishing compound of this invention can include presently publicly known thickening agents, anti-flocculating agents, oxidizing agents, insulation film polishing inhibitors, metal layer polishing accelerants, and pH buffers.

Cocoon-shaped silica particles are colloidal silica with a minor axis of 10~200 nm and ratio of major/minor axis of 1.4~2.2. These cocoon-shaped silica particles, for example, are obtained, as follows. Into an aqueous medium which had been prepared previously, TMOS (tetramethylorthosilane) and methanol mixing materials are introduced at a fixed rate for 10~40 minutes or more desirable for 20~40 minutes, and colloidal silica is synthesized by the hydration reaction. The shape of the cocoon-shaped silica particles is made by the joining of two single spherical particles together, making the so-called cocoon-shape. The above mentioned aqueous medium is usually a mixture of DI water, methanol, and ammonia catalyst, a desired mixture ratio of said ammonia being 0.5~3 weight % of the total weight of the solvent.

The polishing compound containing cocoon-shaped colloidal silica has special characteristics compared to previously known polishing compounds containing single spherical colloidal silica, which are, that the polishing rate is increased without putting scratches (defects) or haze (cloudiness) on the wafer surface, sodium ions are few, in the case of long term storage it is in perpetual suspension, colloidal breaking does not occur easily, and agglomeration and settling do not occur, or are minimized.

Crystal silica particles are relatively large perfectly spherical monodispersed particles in which agglomeration of like-particles does not arise. In the manufacturing method, into a high temperature oxidizing flowing atmosphere including oxygen, high purity metallic silicon is blown in through a nozzle and oxidized continuously. At this time the reaction flame from the heat of oxidation of the oxygen and silicon exceeds 2000 degrees C. and the silicon metal and oxidation products are in the vapor or liquid phase. At this time, the droplets become perfectly spherical particles due to surface tension. Further, in comparing to other synthesis methods, for example, colloidal silica or fumed silica, because there are no chemical compounds other than silicon and oxygen, the synthesized silica not only contains no impurities, such as, sodium, but it forms hard, minute spherical particles close to the theoretical specific gravity. The crystal silica, because its raw material is metal silicon powder, has high purity. Because the shape is perfectly spherical and the contact to the polished surface is a point, and because the hard particles are minute, compared to synthesized silica, polishing without scratching, or minimized scratching, is obtained. Further, crystal silica has better crystallization formation than fumed silica. By the better crystallization, polishing capability is more manifest than in colloidal silica or fumed silica. However, it is difficult to make particles smaller than 70 nm. For the cocoon-shaped silica particles and the combined crystal silica, a powder of average particle size 70~500 nm is suitable, more desirable is 100~300 nm.

When mixing both of the silica particles which have been dispersed in an aqueous medium such as DI water, the wet mechanical alloying method can be used. In this wet mechanical alloying method, the polishing compound and beads are placed inside the pulverizing vessel; by high speed rotation of the pulverizing vessel, the silica in the polishing compound is pulverized and combined by the beads. As a pulverizing medium used in the wet mechanical alloying method, materials such as silica beads, sintered alumina beads, zirconia, partially stabilized zirconia beads, etc. are available in the marketplace, but especially desirable are 0.1~0.3 mm diameter zirconia beads partially stabilized with yttria; it is known that these beads are excellent having the most abrasion resistance. By the wet mechanical alloying method, the cocoon-shaped silica particles which are approximately ½~⅓ the size of the comparatively large crystal silica particles are forced to stick to the surface of the crystal silica particles, further they are held in suspension together with the more numerous cocoon-shaped silica particles. Because this kind of mixture is made, regarding the ratio of cocoon-shaped silica particles and crystal silica particles, for cocoon-shaped silica, crystal silica at 0.5~80 weight % is suitable, a desirable amount is 0.5~40 weight %. Further desirable for 1 cocoon-shaped silica is 0.5~20 weight % crystal silica. The ratio of each can be changed depending on the purpose of use; in the case of obtaining a polishing compound for stock removal polishing, for 1 cocoon-shaped silica, 50~80 weight % crystal silica is desirable, in the case of a polishing compound for intermediate polishing, for 1 cocoon-shaped silica, 20~50 weight % crystal silica is desirable, and in the case of a polishing compound for final step polishing, for 1 cocoon-shaped silica, 0.5~20 weight % crystal silica is desirable.

Using the above described combined polishing abrasives, it is desirable to add a small amount of water-soluble polymers, as a means to maintain the cleanliness of the polished surface, free of haze (cloudiness). On the polished and clean surface of the substrate wafer, a hydrophilic layer is made for the purpose of preventing the appearance of stains called water marks. As disclosed in patent bulletin H11-116942 a chemical compound containing an alcohol hydroxyl group used at the same time is very effective. According to the invention, it is better to use a water-soluble polymer combined with an acid salt.

The combination of water-soluble polymers that can be used desirably according to this invention is at least one type selected from the groups including ammonium nitrate and ammonium acetate and at least one type selected from methylcellulose, carboxymethylcellulose, hydroxyethylcellulose, and the group including carboxymethylcellulose. According to an embodiment, an amount of multiple water-soluble polymers added is 0.01~0.5 weight % total is suitable, a further embodiment of an amount is 0.1~0.3 weight %, the smallest permitted amount for waste control. An embodiment of a combination of water-soluble polymers includes ammonium nitrate and hydroxyethylcellulose. Although somewhat water soluble, hydroxyethylcellulose and other forms of cellulose, are difficult to dissolve in water, and have a tendency for undissolved portions to appear, which can cause defective polishing slurries. First dissolving ammonium nitrate and afterwards dissolving hydroxyethyl cellulose is a method to make a uniform solution without the appearance of undissolved portions.

Even if partially stabilized zirconia beads are used as a mechanical alloying medium, the amount of abrasion is not zero, there is a very small amount of abrasion. The generated abrasion detritus, if it is present in the slurry, and during polishing, can easily be a cause of producing scratches on the wafer surface. It is desired to take away, remove, the abrasion detritus from the slurry. As a method to eliminate the abrasion detritus, ultra high speed centrifuge equipment, long-term settling, microfiltration, ultrafiltration, etc. are available, but as an appropriate method, ultrafiltration using hollow fibers is the most suitable. Without allowing particles larger than 1 micron to pass through walls of the hollow fibers, particles less than 0.5 microns are passed through. Ultrafiltration by passage through hollow fibers, just like blood flow through blood vessels, the fiber filter walls are always being self-cleaned and particles below 0.5 microns pass through the walls, and this arrangement returns the large particles. However, because there are hollow fibers, there is a very large filter surface area provided. This provides a favorable arrangement for filtering quietly, to the extent possible, applying no pressure, so as not to push and enlarge any defects in the filter. A compared with ordinary filtering methods using filter cloth, blockages in the filter cloth occur frequently, and the flow of filtrate becomes extremely low. Further, it is not easy to remove the blockages by washing.

Further, cocoon-shaped silica particles and crystal silica particles can be combined using a high pressure homogenizer. By the collisions which the aqueous dispersants undergo with each other in the aqueous medium, a high pressure homogenizer can make a dispersed mixture of silica particles.

It is desirable that the amount of silica particles contained be 10~25 weight % of the polishing compound, 10~20 weight % is more desirable. For a slurry with a concentration exceeding 25 weight %, it can happen that colloidal breaking occurs, and gelation, after which even ultrasonic dispersion cannot return it to its original state. Conversely, in the case that the concentration is lower than 10 weight %, transportation fees increase and it is uneconomic. Ordinarily, for final polish, a 10 weight % liquid is used diluting with DI water 15~20 times at the point of use.

Mixing 3 parts by volume TMOS and 1 part by volume methanol, the raw material solution is made for synthesis of cocoon-shaped silica particles. In a 10 liter reaction tank a reaction solvent is made by mixing previously prepared 1 weight % ammonia, 15 weight % DI water, and the remainder methanol. Because some amount of heat is generated by the reaction, the reaction temperature is maintained at 20° C. by cooling with cooling water. For 9 parts by volume of reaction solvent, 1 part raw material solution is introduced into the reaction tank over a 25 minute period at a steady rate. As a result, the cocoon-shaped particles are synthesized. After concentrating the synthesized slurry, the solids concentration is 15 weight %.

Figure 2:
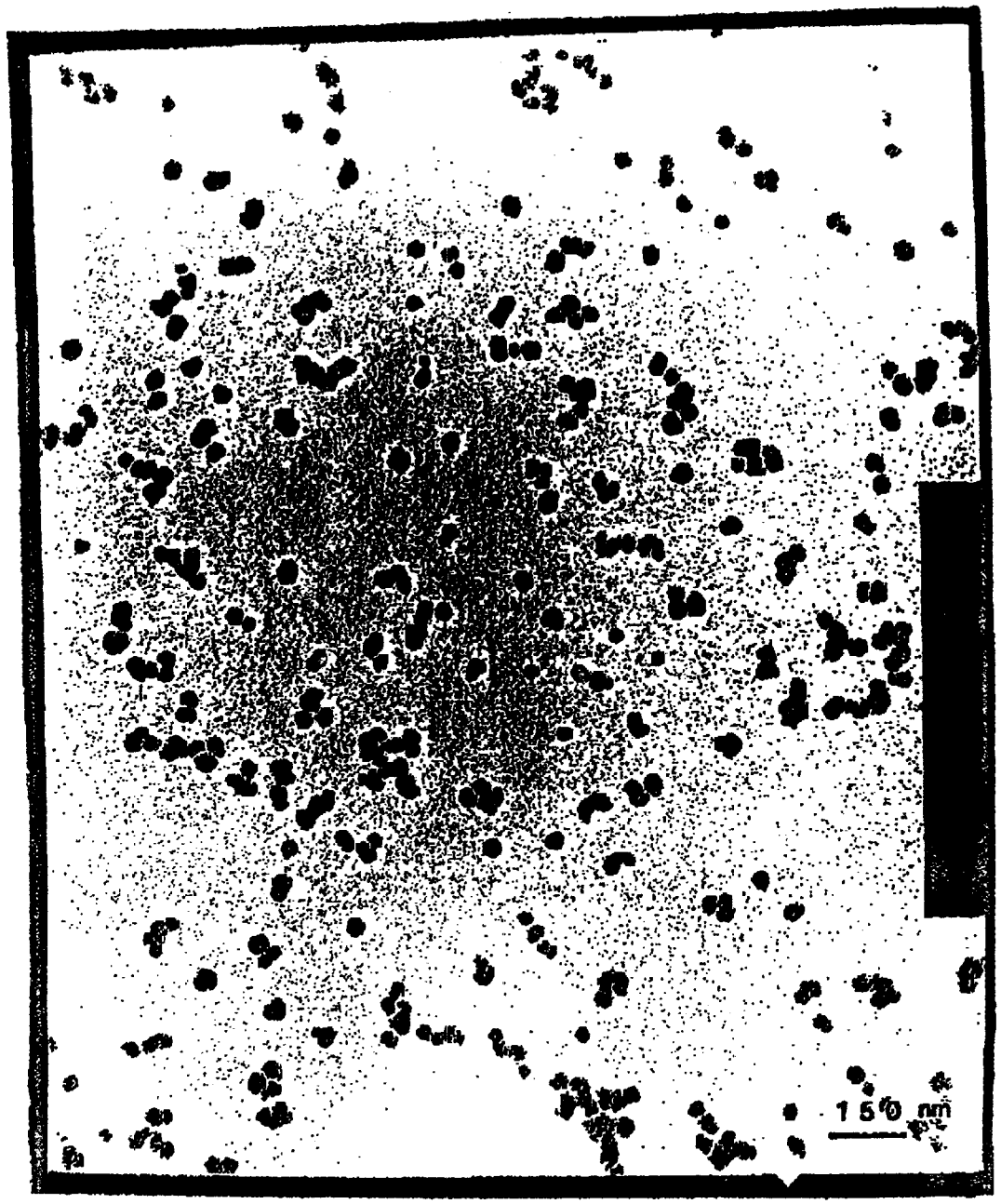
FIG. 2 is a photomicrograph of cocoon-shaped colloidal silica particles

Crystal silica is made according to the following process. Purchasing high purity silica SO-E1 made by Admatechs Company obtained by the evaporation and oxidation of metal silicon using the specially shaped burner mentioned in Japanese patent bulletin H7-247105, 15 weight % is suspended in DI water to make a slurry. The average particle size of the cocoon-shaped silica particles is 80 nm diameter, and the crystal silica particles are in two types with size of 200 nm and 300 nm diameter. Further, photomicrographs of the particles are shown in FIG. 1 and FIG. 2. The cocoon-shaped silica particles and crystal silica slurry was analyzed, and the amount of metal contaminants was extremely small. The results are presented in Table 1 of the Appendix.

To perform wet mechanical alloying combination, the combining was done using as a pulverizing machine SC Mill SC150/50XZ made by Mitsui Kozan Company and as a pulverizing medium YTZ 0.2 mm diameter beads ($Zr_2Y_2O_3$ (5%)) made be Nikkato Company.

Regarding the silica solids content, 10 liters each of slurries with colloidal silica (cocoon-shaped silica particles) were prepared with proportions of crystal silica of 0.5 weight %, 50 weight %, 80 weight %, and 100 weight %. With the rotation speed of the SC Mill set at 1000 rpm high speed rotation, each slurry was mechanical-alloying combined for 10 minutes.

Afterwards, using a Toray Cube hollow fiber module made by Toray Engineering Company, ultrafiltration was carried out, then water-soluble hydroxyethylcellulose which had previously been dissolved in water to which ammonium nitrate had previously been added was added, finally ammonia was added to make a polishing slurry of 10.3 pH. The metal impurities content of the obtained slurry was very low.

The polishing rate of the polishing slurry obtained as mentioned above was compared to Rodel Company's Nalco 2350 stock removal polishing slurry which available in the commercial marketplace. For the results, the polishing conditions were the conditions shown in Table 2.

Figure 3:
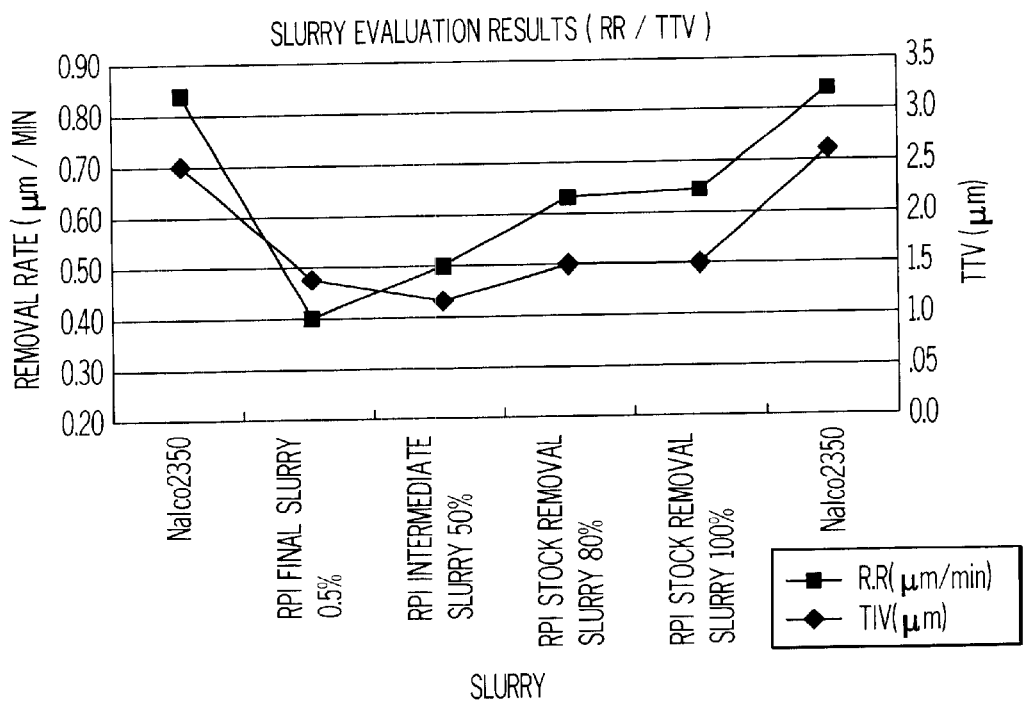
FIG. 3 is a graph showing evaluation results of various slurries
Figure 4:
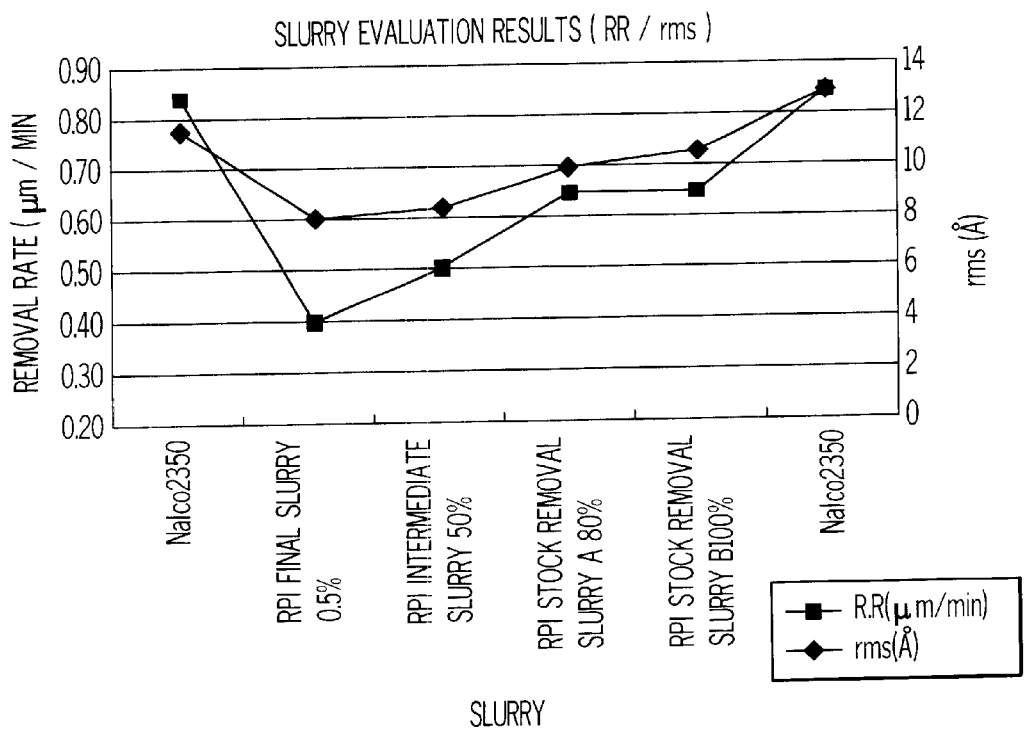
FIG. 4 is a graph showing evaluation results of various slurries

The results are shown in Table 3, FIG. 3, and FIG. 4.

In Table 3, RR is polishing rate, TTV is total thickness variation, rms is surface roughness, and Note is the test number. RPI Final Slurry is the polishing compound of this invention containing 0.5 weight % crystal silica particles with cocoon-shaped particles as a base (hereafter called RPI Final Slurry); RPI Intermediate Slurry is the polishing compound of this invention containing 50 weight % crystal silica particles with cocoon shaped particles as a base; RPI Stock Removal Slurry.A is the polishing compound of this invention containing 80 weight % crystal silica particles with cocoon shaped particles as a base; and RPI Stock Removal Slurry B is the polishing compound of this invention containing 100 weight % crystal silica particles with no cocoon-shaped particles.

From the results disclosed by Table 3, the following can be understood. The polishing capability of the 0.5 weight % crystal silica mechanical-combined in cocoon-shaped silica as a base was 0.48 times the speed of the Nalco2350. When the combined crystal silica is increased to raise the polishing capability, at 50% the speed is 0.60 times and at 80% 0.77 times.

In the slurry which was all 100% crystal silica, the polishing capability was 0.78 times the speed. At a crystal silica level of 100% the same polishing capability speed of the Nalco2350 is not obtained because there is a difference in the alkaline compounds; in examples comparing the strong alkaline pH adjusting agent KOH to NaOH which is used in the Nalco2350 almost the same level results should be obtained.

Figure 5:
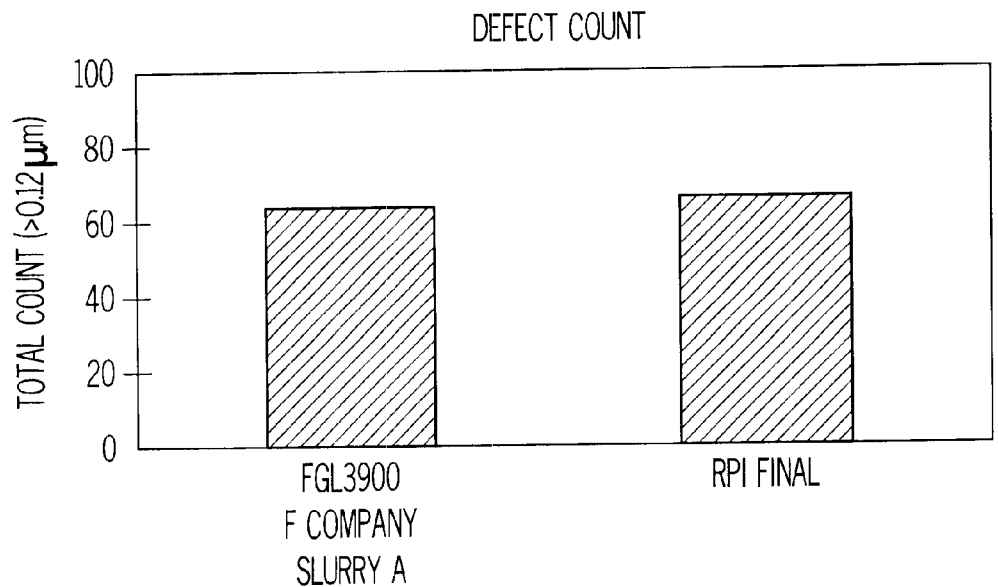
FIG. 5 is a graph showing slurry defects according to number of LPDs.
Figure 6:
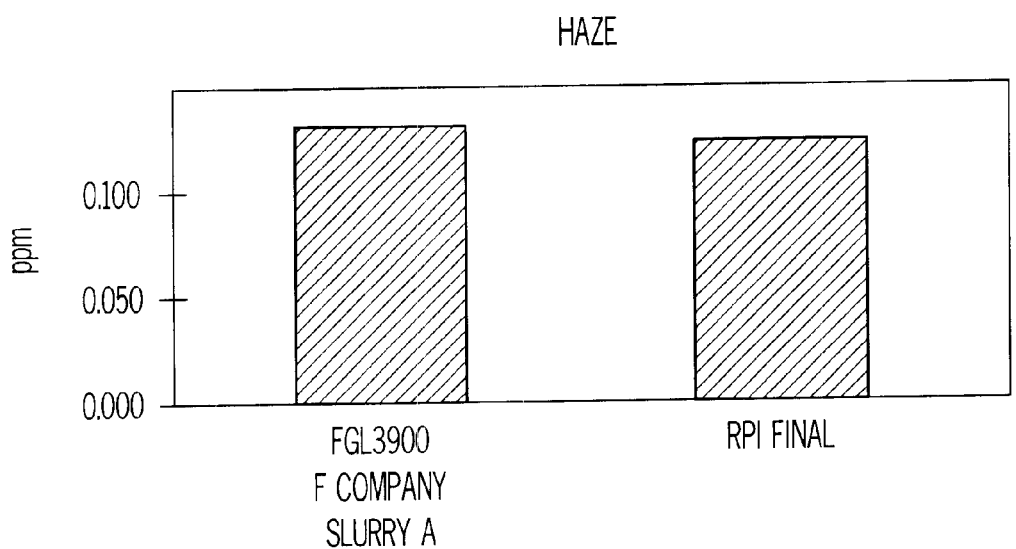
FIG. 6 is a graph showing slurry haze

According to another embodiment, cocoon-shaped silica particles combined with 0.5 weight % and a final polishing slurry made by F company polished under the same polishing conditions (final polish) and the size of defects were compared. Polishing was done under the conditions of Table 4, see Appendix, using a Strasbaugh6-DS as a polishing test machine. During polishing, the slurry temperature was strictly controlled so that it would not rise (refer Table 6). Naturally it was necessary to match the load applied to the rotation motor closely. Defects (defects: number of LPD) and haze was measured using Surfacan 6229 model equipment made by Tencor Company, and evaluation of flatness (surface flatness, units Å) was done using New View 100 made by Zygo Company. These results were that the final polishing slurry combined with 0.5% crystal silica in cocoon-shaped particles as a base had the same level in final polishing as the prior F Company slurry. These results are shown in Table 5, FIG. 5, and FIG. 6. In this case, there was almost no difference in the condition of polishing rate. The cocoon-shaped silica particle slurry as a base has the same level of performance of final polishing as was obtained by prior slurries in the market. Examples of polishing operations of the three polishing steps; stock removal polishing, intermediate polishing, and final polishing, can easily be made by increasing or decreasing the amount of combined crystal silica as described above.

By this invention, through the joint use of cocoon-shaped silica particles and crystal silica particles, a polishing slurry is provided, which prevents silica agglomeration, and which does not cause the appearance of scratches or haze (cloudiness) caused by large agglomerations of particles, and which has no contaminants.

According to the invention, high purity and minute, hard, perfectly spherical silica (crystal silica) formed by the deflagration phenomenon is used to combine with cocoon-shaped silica particles by the wet mechanical combination method.

Previous to the invention, polishing was done using the same polishing machine for stock removal and intermediate polishing, and a different polishing machine for final polish. Further, depending on the conditions, different polishing machines were used for each of the three different polishing steps. With this invention, one polishing machine can be used for all three polishing processes.

Further, according to the invention, the lowest amount necessary of chemicals are used, not relying on the efficacy of chemical additives of water-soluble cellulose and types of water-soluble amines, which provides high purity polishing abrasives with minimized environmental impact on waste water.

Embodiments of the invention having been disclosed, other embodiments and modifications of the invention are intended to be covered by the spirit and scope of the appended claims.

TABLE 1

Metal Impurities
units: ppm, parts per million.

| Metal | Al | Fe | Cu | Ni | Ca | Zn | Na | Cr | Zr |
|---|---|---|---|---|---|---|---|---|---|
| Cocoon-shaped colloidal silica | 0.3 | 0.1 | <0.2 | <0.2 | 0.6 | 0.4 | 5.3 | <0.01 | <2 |
| crystal silica | 1.2 | 0.8 | <0.2 | <0.2 | <0.05 | <0.2 | <0.3 | 0.2 | <2 |

TABLE 2

Stock Removal Polishing Conditions

| | |
|---|---|
| applied pressure: | 450 g/cm$^2$ |
| lower platen rotation speed: | 115 rpm |
| workpiece rotation speed: | 100 rpm |
| slurry flow rate: | 300 ml/min |
| polishing time: | 30 min |

TABLE 3

Polishing Results

| | RR (μm/min) | TTV (μm) | rms (Å) | Note |
|---|---|---|---|---|
| Nalco 2350 | 0.83 | 2.5 | 11.56 | 1 Run |
| RPI Final Slurry | 0.40 | 1.4 | 7.82 | 2, 3 Run |

TABLE 3-continued

Polishing Results

|  | RR (μm/min) | TTV (μm) | rms (Å) | Note |
|---|---|---|---|---|
| RPI Intermediate Slurry | 0.50 | 1.2 | 8.41 | 4, 5 Run |
| RPI Stock Removal Slurry A | 0.64 | 1.5 | 9.78 | 6, 7 Run |
| RPI Stock Removal Slurry B | 0.65 | 1.5 | 10.38 | 8, 9 Run |
| Nalco 2350 | 0.83 | 2.6 | 12.71 | 10 Run |

TABLE 4

Polishing Method

| Polishing time, pressure | 300 s 3 psi, 200 s 1 psi |
|---|---|
| Table head speed | 74 rpm 3 psi, 60 rpm 1 psi |
| Slurry flow rate | 300 ml/min |
| Rinse | 45 s |
| Total time | 845 sec |
| 1 wafer per polishing run | |

TABLE 5

| Run Order/ W # | Slurry | Defects (>0.12 μm) | Haze (ppm) | Roughness Ra (Å) | Removal (μm) |
|---|---|---|---|---|---|
| 1 | F Company, Slurry A | 84 | 0.120 | 1.92 | 0.010 |
| 2 | F Company, Slurry A | 66 | 0.124 | 1.91 | 0.020 |
| 3 | RPI Final | 62 | 0.120 | 1.83 | 0.019 |
| 4 | RPI Final | 71 | 0.112 | 1.95 | 0.022 |
| 5 | F Company, Slurry A | 40 | 0.121 | 1.84 | 0.012 |

TABLE 6

| Run Order/W # | Slurry | Maximum Pad Temperature (° C.) | Table Motor Load (Amps) |
|---|---|---|---|
| 1 | F Company Slurry A | 22.2 | 4.5 |
| 2 | F Company Slurry B | 22.4 | 4.3 |
| 3 | RPI Final | 22.6 | 4.3 |
| 4 | RPI Final | 23.4 | 4.3 |
| 5 | F Company Slurry B | 23.2 | 4.3 |

What is claimed is:

1. A polishing compound containing cocoon-shaped silica particles and crystal silica particles.

2. A polishing compound as stated in claim 1 which is formed with composite polishing abrasives containing at least a portion of cocoon-shaped silica particles and at least a portion of crystal silica particles.

3. A polishing compound as stated in claim 1 or claim 2 in which the crystal silica particles are present in an amount of 0.5 to 80 weight % of the combination with cocoon-shaped silica particles.

4. A polishing compound as stated in claim 2 in which the composite of the cocoon-shaped silica particles and crystal silica particles is made using wet mechanical alloying combination technology.

5. A polishing compound as stated in claim 1 or claim 2, further containing 0.01 to 0.5 weight % of multiple water-soluble polymers.

6. A polishing compound as stated in claim 5 in which the water-soluble polymers comprises at least one selected from the group consisting of ammonium nitrate and ammonium acetate and at least one selected from the group consisting of methylcellulose, carboxymethylcellulose, hydroxyethylcellulose.

7. A polishing compound containing 100 parts by weight DI water, 10.0 to 20.0 parts by weight silica composite polishing abrasives, 0.01 to 0.5 parts by weight multiple water-soluble polymers and alkaline compounds for pH adjustment, said silica composite polishing abrasives being formed by combining cocoon-shaped silica particles and crystal silica particles.

8. A polishing compound comprising cocoon shaped silica particles, crystal silica particles and water soluble polymers, wherein the water soluble polymers comprises at least one selected from the group consisting of ammonium nitrate and ammonium acetate and at least one selected from the group consisting of methylcellulose, carboxymethylcellulose and hydroxyethylcellulose.

* * * * *

UNITED STATES PATENT AND TRADEMARK OFFICE
CERTIFICATE OF CORRECTION

PATENT NO. : 6,544,307 B2
DATED : April 8, 2003
INVENTOR(S) : Shimamoto et al.

It is certified that error appears in the above-identified patent and that said Letters Patent is hereby corrected as shown below:

<u>Title page,</u>
Item [73], Assignee, reads "Rodel Holdings, Inc., Wilmington, DE (US)", should read
-- Rodel-Nitta Corporation, Nara Pref (JP) and Admatechs Co., Ltd, Tokyo (JP) --

Signed and Sealed this

Fifteenth Day of July, 2003

JAMES E. ROGAN
*Director of the United States Patent and Trademark Office*